United States Patent [19]

Scola et al.

[11] 4,304,694

[45] Dec. 8, 1981

[54] HIGH DAMPING EPOXY RESIN COMPOSITE

[75] Inventors: Daniel A. Scola; Marvin C. Cheney, Jr., both of Glastonbury, Conn.

[73] Assignee: United Technologies Corporation, Hartford, Conn.

[21] Appl. No.: 99,767

[22] Filed: Dec. 3, 1979

[51] Int. Cl.³ ............................................. C08L 91/00
[52] U.S. Cl. ................................ 260/18 EP; 260/18 N; 260/37 EP
[58] Field of Search ............ 260/37 EP, 18 EP, 18 N; 525/524; 428/902, 417, 418

[56] References Cited

U.S. PATENT DOCUMENTS

| | | | |
|---|---|---|---|
| 1,463,556 | 7/1923 | Reed | 416/240 |
| 2,470,056 | 5/1949 | Seibel | 416/226 |
| 2,575,533 | 11/1951 | Seibel | 416/138 |
| 2,621,140 | 12/1952 | Bitterli et al. | 264/258 |
| 2,659,444 | 11/1953 | Stanley | 416/226 |
| 3,013,746 | 12/1961 | Siebenthal | 244/17.11 |
| 3,098,723 | 7/1963 | Micks | 428/389 |
| 3,215,370 | 11/1965 | Strydom | 244/17.11 |
| 3,217,808 | 11/1965 | Elmer | 416/53 |
| 3,228,479 | 1/1966 | Nagler | 416/149 |
| 3,237,697 | 3/1966 | Ford et al. | 416/226 |
| 3,321,019 | 5/1967 | Dmitroff et al. | 416/229 R |
| 3,330,362 | 7/1967 | Kastan | 416/100 |
| 3,384,185 | 5/1968 | Fernandez | 416/244 R |
| 3,395,760 | 8/1968 | Hoffman | 416/92 |
| 3,445,282 | 5/1969 | Olson et al. | 525/524 |
| 3,477,796 | 11/1969 | Weiland | 416/204 R |
| 3,483,146 | 12/1969 | Janssen et al. | 525/524 |
| 3,484,174 | 12/1969 | McCoubrey | 416/132 R |
| 3,518,221 | 6/1970 | Kenyon et al. | 260/37 EP |
| 3,528,753 | 9/1970 | Dutton et al. | 416/226 |
| 3,533,714 | 10/1970 | Pfleiderer | 416/144 |
| 3,558,082 | 1/1971 | Bennie | 244/17.25 |
| 3,559,923 | 2/1971 | Moore | 244/17.11 |
| 3,562,198 | 2/1971 | Slocombe | 260/37 EP |
| 3,567,797 | 3/1971 | Mango et al. | 525/524 |
| 3,598,693 | 8/1971 | Andersen et al. | 428/221 |
| 3,627,466 | 12/1971 | Steingiser | 423/447.7 |
| 3,658,748 | 4/1972 | Andersen et al. | 260/37 EP |
| 3,667,863 | 6/1972 | Breuner | 416/138 |
| 3,669,566 | 6/1972 | Bourzuardez et al. | 416/134 R |
| 3,713,753 | 1/1973 | Brunsch | 416/226 |
| 3,796,513 | 3/1974 | Jonas | 416/224 |
| 3,799,701 | 3/1974 | Rothman | 416/226 |
| 3,806,489 | 4/1974 | Rieux et al. | 260/38 |
| 3,812,064 | 5/1974 | Nichols | 260/18 EP |
| 3,874,820 | 4/1975 | Fenaughty | 416/226 |
| 3,876,607 | 4/1975 | Snell et al. | 260/37 EP |
| 3,879,153 | 4/1975 | Breuner | 416/141 |
| 3,880,551 | 4/1975 | Kisovec | 416/134 R |
| 3,908,040 | 9/1975 | Dauksys | 427/58 |
| 3,923,571 | 12/1975 | Aoki et al. | 156/94 |
| 3,943,090 | 3/1976 | Enever | 260/37 EP |
| 3,950,115 | 4/1976 | Euler | 416/226 |
| 3,957,227 | 5/1976 | Baskin | 244/17.25 |
| 3,957,716 | 5/1976 | Weldy | 260/37 EP |
| 3,967,996 | 7/1976 | Kamov et al. | 156/156 |
| 3,972,821 | 8/1976 | Weidenbenner et al. | 252/75 |
| 3,989,673 | 11/1976 | Jenkins et al. | 528/117 |
| 3,999,886 | 12/1976 | Ormiston et al. | 416/104 |
| 4,008,980 | 2/1977 | Noehren et al. | 416/134 A |
| 4,012,169 | 3/1977 | Mouille et al. | 416/134 A |
| 4,037,988 | 7/1977 | Laird | 416/141 |
| 4,083,735 | 4/1978 | Caramanian | 260/37 EP |
| 4,115,599 | 9/1978 | Taylor | 525/524 |

FOREIGN PATENT DOCUMENTS 951301 7/1974 Canada .
532399 2/1922 France .
1334446 7/1963 France .

OTHER PUBLICATIONS

Cheney; Results of Preliminary Studies of a Bearingless Helicopter Rotor Concept; American Helicopter Society 28th National Forum; 5/72.

*Primary Examiner*—Lewis T. Jacobs
*Attorney, Agent, or Firm*—Harry J. Gwinnell

[57] ABSTRACT

An epoxy resin based composite is described with improved damping properties along with good strength and modulus of elasticity. The composition comprises a stiff epoxy such as epichlorohydrin-bisphenol A diglycidyl ether epoxy mixed with a flexible epoxy such as linoleic dimer acid glycidyl ester epoxy and a flexible cross-linking agent such as a long chain amine-fatty acid amide. The composition in admixture with high modulus fibers such as graphite forms composites with high damping properties, good strength and high modulus of elasticity. Typical uses for the composites of the present invention are flexural beams for hingeless-bearingless rotors and acoustical barrier material.

5 Claims, 9 Drawing Figures

HIGH DAMPING EPOXY RESIN COMPOSITE

BACKGROUND OF THE INVENTION

1. Field of the Invention

The field of art to which the invention pertains is mixed epoxy resin compositions and fiber containing composites made therefrom.

2. Description of the Prior Art

While the prior art has considered various resin mixtures for various purposes, a high damping resin composition with good strength and modulus of elasticity properties is not available. For example, while U.S. Pat. Nos. 3,518,221; 3,598,693; 3,658,748; and 3,923,571 all teach epoxy resin composition mixtures including cross-linking agents, none recognize or address the problem of high damping properties. Similarly, while these same references teach additions of various fibrous filler material (3,923,571 excluded), none contemplate high damping composites so constituted.

BRIEF SUMMARY OF THE INVENTION

The present invention is directed to an epoxy resin composite with high damping, high strength and high modulus of elasticity properties. The resin component comprises about 12 to about 35% by weight of a high stiffness epoxy resin in admixture with about 20 to about 43% by weight of a flexible epoxy resin and about 35 to about 61% by weight of a flexibilizing curing agent. A composite of such resin in admixture with about 20 to about 50% reinforcing fibers results in a high damping, high strength and high modulus composite.

DETAILED DESCRIPTION OF PREFERRED EMBODIMENTS

Figure 1:
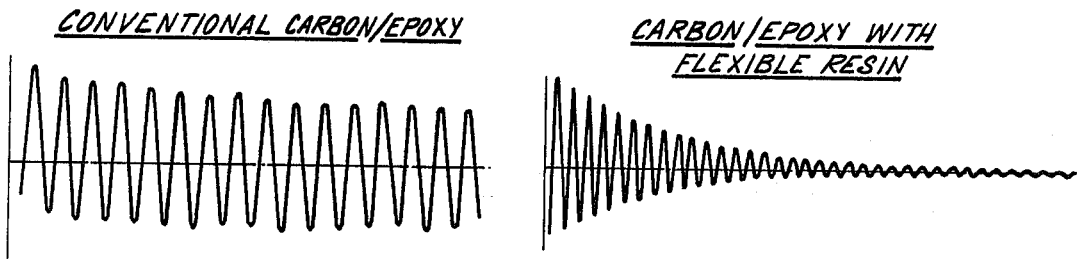
FIG. 1 demonstrates a comparison of damping curves of conventional carbon-epoxy composites with carbon-epoxy composites of the present invention.
Figure 2:
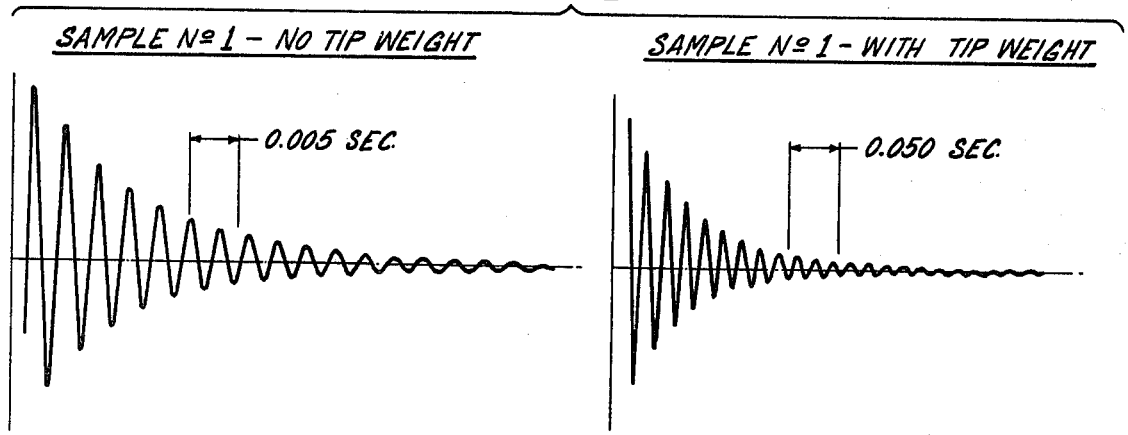
FIGS. 2, 3, 4, 5, 6 and 7 compare the damping curves of composites of the present invention based on different percents of the components, with and without tip weights.
Figure 3:
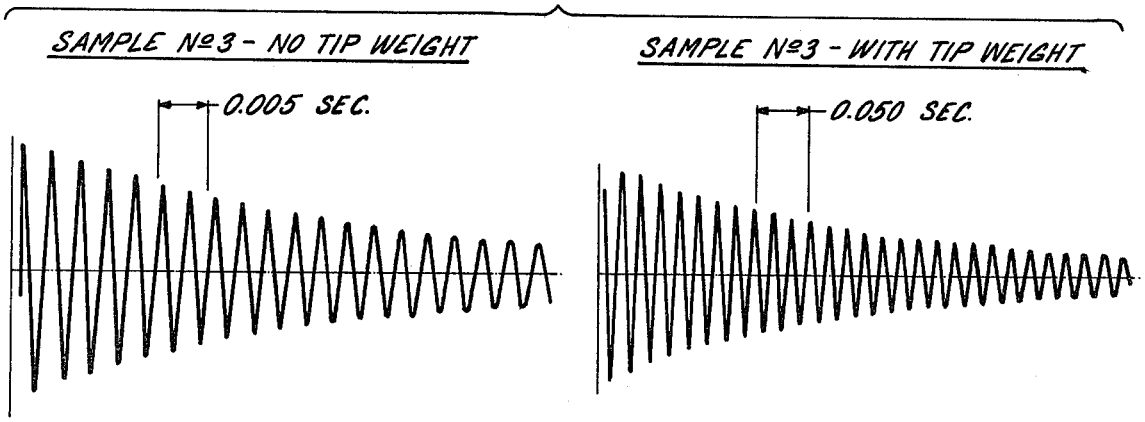
Figure 4:
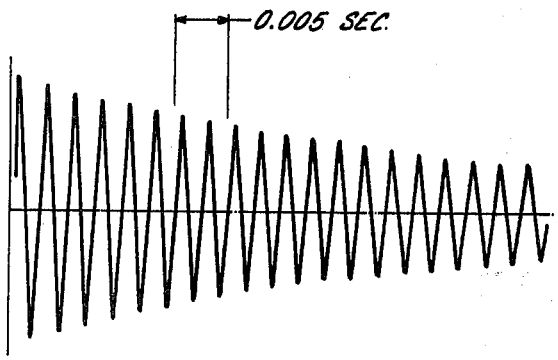
Figure 4:
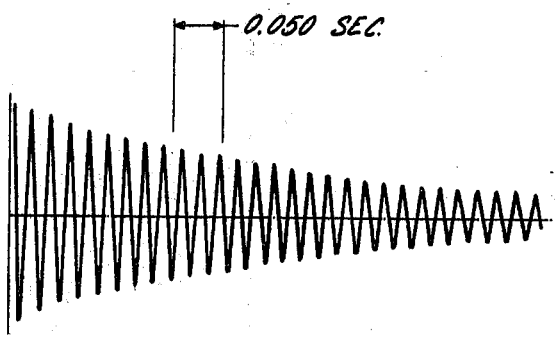
Figure 5:
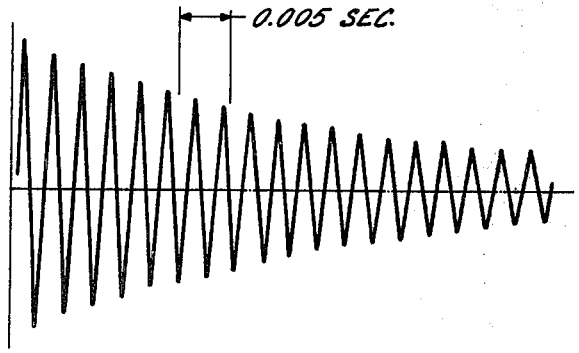
Figure 5:
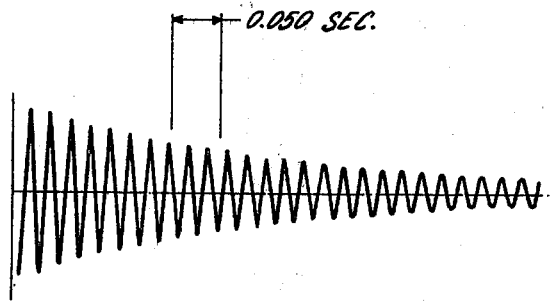
Figure 6:
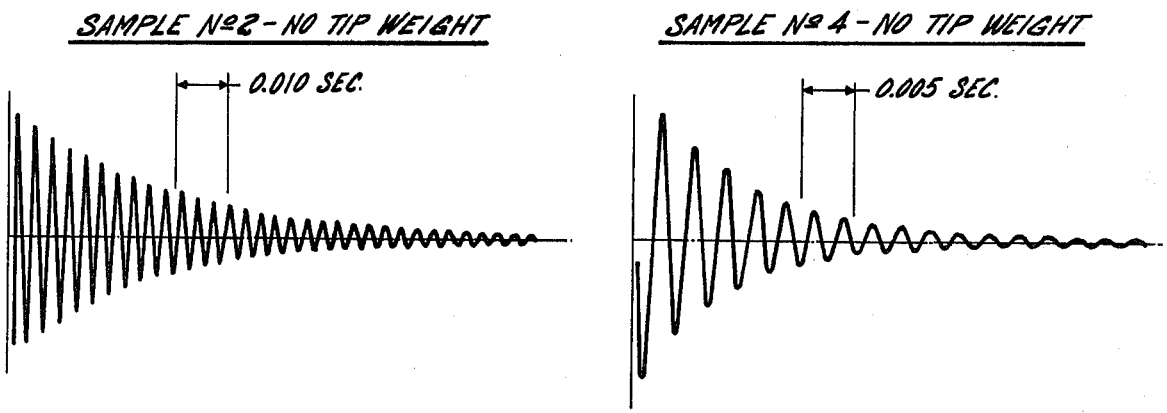
Figure 7:
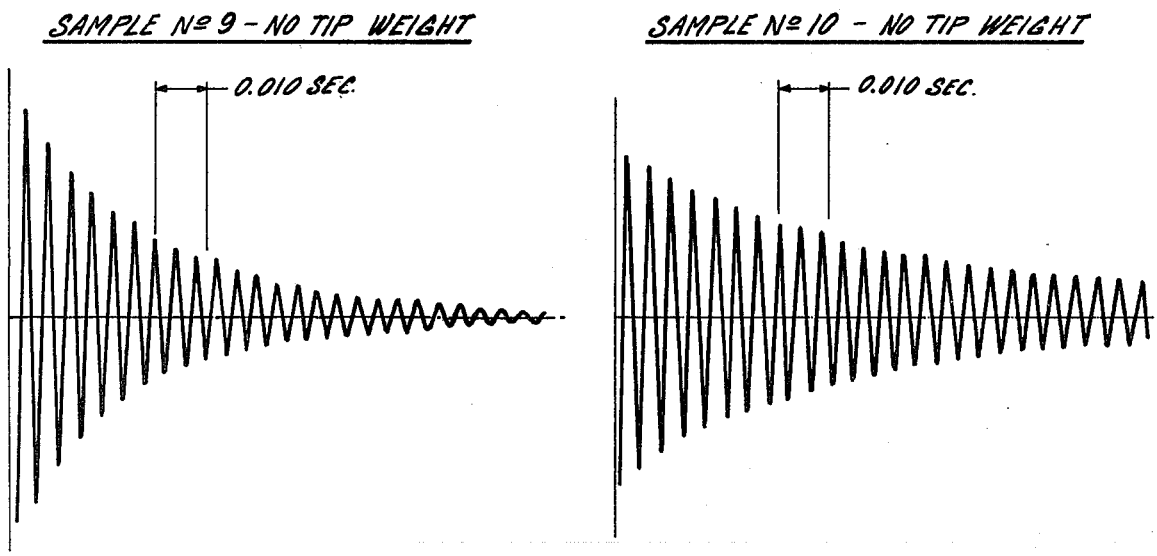

The main components of the high damping composites of the present invention are the admixture of a flexible long chain aliphatic epoxy component with a standard bisphenol-A stiff epoxy resin, and a flexible long chain amine fatty acid amide curing agent, blended in specific percentage ranges.

As the flexible epoxy an epichlorohydrin-bisphenol A diglycidyl ether epoxy is used such as Epon 828. Structurally, this is shown as follows:

where n=0, 1 or 2 (G.P.C. determined molecular weights of 340, 608 and 876 respectively).

The stiff epoxy component is a diglycidyl ester linoleic dimer acid such as Epon 871 with the structural formula as follows:

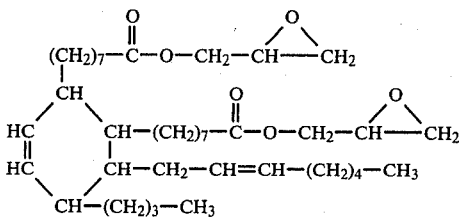

The curing agent is a flexible cross-linking agent which is a long chain amine fatty acid amide such as Versamid V-40 (General Mills).

In order to obtain the improved damping, strength and modulus properties of the composites of the present invention, these materials must be used in a specific percentage range. The flexible epoxy (such as Epon 828) is used in a range of from about 20 to about 43% by weight and preferably about 27% by weight, the stiff epoxy (such as Epon 871) is used in a range of about 12 to about 35% by weight and preferably about 27% by weight, and the flexible curing agent (such as Versamid V-40) is used in a range of about 35 to about 61% by weight and preferably about 49% by weight.

Composites were formulated by dissolving the resin formulation in a solvent such as methyl ethyl ketone to make an approximately 50% by weight solution. Graphite fibers were preferably used in reinforcing the composites such as HMS (Hercules) and Thornel 75 (Union Carbide) of continuous tow. Fiber loading was about 20% to about 50% by weight based on weight of fiber plus resin composition, and preferably about 42% by weight. The graphite fibers were directed by a pulley through the resin bath and wound onto a 17 inch diameter, 6 inch wide drum to produce a resin impregnated tape approximately 4 inches wide for testing purposes. The particular length and thickness of the tape can be varied depending on the ultimate use. After application to the drum the solvent was evaporated from the tape at room temperature. The tape was removed and cut into four 12 inch sections and cured to B stage in an oven at approximately 80° C. for approximately 15 minutes under vacuum. The tapes were removed and cut into approximately 4 by 6 inch sections and laid one over the other in a mold for production of a multi-layered composite. While fiber laying can be in any desired orientation in the composite, unidirectional laying is preferred for flexbeam uses, for example, and cross-ply laying (e.g., 0°, 45°, 90°; 0°, 30°, 60°; 0°, 90°, etc.) for other uses such as acoustical or spar uses. The mold was placed in a preheated press at about 100° C. and a constant pressure of approximately 200 psi for 10 minutes was imposed followed by curing under this pressure at 100° C. for approximately one hour. The molded composite was then post-cured for one hour at

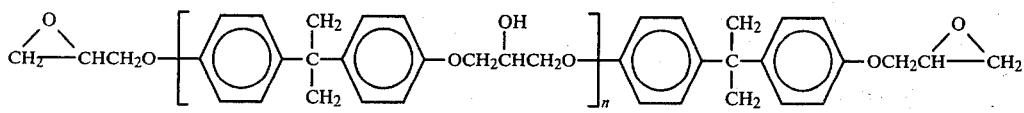

approximately 125° C. After removal from the mold, the composite was cut into appropriate sample size shapes for physical, mechanical, and damping tests. Sample formulations are demonstrated by Table I and physical property measurements by Table II. While the composites of the present invention can be formed in any desired shape, depending on their use, square and rectangular cross-section composites are preferred, especially for flexbeam use, because of their ease of fabrication and particular high damping properties.

damping samples such as 1, 4 and 9, the curve became non-linear significantly prior to failure and thus the values of modulus given in Table III for these specimens are somewhat misleading. Nominal values of approximately 75% of those listed will be more realistic for preliminary design purposes. It should also be noted that the flexure modulus determined from four-point loading tests correlates well with axial tests. However, it is found to be considerably higher than that determined from three-point and cantilevered tests. This difference is caused by the influence the matrix has in carrying load.

TABLE II

Some Physical Properties of High Damping Graphite/Epoxy Composite

| Sample No. | Resin Form | Graphite Fiber Type | Vol. % Fiber | Vol. % Resin | Vol. % Void | Density gm/cc | Plies | Thickness in. |
|---|---|---|---|---|---|---|---|---|
| 1 | A | HMS | 18.7 | 68.4 | 12.9 | 1.21 | 7 | 0.200 |
| 2 | A | Thornel 75 | — | — | — | — | 16 | 0.124 |
| 3 | C | Thornel 75 | 31.9 | 63.4 | 4.8 | 1.36 | 16 | 0.142 |
| 4 | B | Thornel 75 | 29.7 | 59.6 | 10.7 | 1.28 | 15 | 0.137 |
| 5 | D | Thornel 75 | 28.7 | 62.2 | 9.18 | 1.29 | 16 | 0.138 |
| 6 | E | Thornel 75 | 31.9 | 58.9 | 9.2 | 1.31 | 16 | 0.137 |
| $7^2$ | H | Thornel 75 | 45 | 55 | — | 1.70 | 22 | 0.137 |
| $8^2$ | F | Thornel 75 | 40 | 60 | — | 1.50 | 21 | 0.155 |
| $9^2$ | G | Thornel 75 | 42 | 58 | — | 1.55 | 22 | 0.155 |
| $10^{1,2}$ | G | Thornel 75 | 42 | 58 | — | 1.55 | 22 | 0.155 |

[1] An additional cure cycle was used on a portion of composite No. 9 to yield No. 10. The additional cure was 2 hrs at 150° C.
[2] The physical properties for these composites are estimated values.

TABLE III

Mechanical and Damping Properties of High Damping Graphite/Epoxy Composites

| | | | Flexural Properties | | | | Torsional Shear Properties | |
|---|---|---|---|---|---|---|---|---|
| Sample No. | Strength[2] $10^3$ psi | Modulus[2] $10^6$ psi | Bending Frequency, cps w/o tip wt | Bending Frequency, cps w/tip wt | Damping, % Critical w/o tip wt | Damping, % Critical w/tip wt | Modulus psi | Stress @ Elastic Limit[1] psi |
| 1 | — | — | 340 | 53 | 4.40 | 5.45 | $<5.8 \times 10^3$ | <70 |
| 2 | 26.77 | 23.3 | 313 | — | 1.77 | — | $1.0 \times 10^5$ | ~400 |
| 3 | 42.89 | 22.9 | 378 | 53 | 1.21 | 1.17 | $1.31 \times 10^5$ | ~615 |
| 4 | 6.45 | 12.5 | 336 | — | 5.12 | — | $<1.03 \times 10^4$ | <135 |
| 5 | 49.6 | 21.8 | 385 | 55 | 0.87 | 0.90 | $2.11 \times 10^5$ | >1500 |
| 6 | 33.47 | 21.1 | 373 | 52 | 1.15 | 1.19 | $1.01 \times 10^5$ | ~403 |
| 7 | 24.12 | 24.8 | — | — | — | — | $1.82 \times 10^5$ | 660 |
| 8 | 39.1 | 27.6 | — | — | — | — | $2.49 \times 10^5$ | >1210 |
| 9 | 15.6 | 14.3 | 244 | — | 2.64 | — | $<3.88 \times 10^4$ | <95 |
| 10 | 18.14 | 16.4 | 238 | — | 1.3 | — | $1.10 \times 10^5$ | 300 |

[1] Determined as the stress at which creep occurred while loading, or the stress at which nonlinear behavior was observed.
[2] 4-point, S/D = 20/1. Average of two measurements.

TABLE I

Flexible Epoxy Resin Compositions

| | Formulation (wt., gm) | | | | | | | |
|---|---|---|---|---|---|---|---|---|
| Material | A | B | C | D | E | F | G | H |
| Epon 828 | 50 | 40 | 75 | 75 | 60 | 60 | 50 | 50 |
| Epon 871 | 50 | 60 | 25 | 40 | 40 | 40 | 45 | 40 |
| Versamide V-40 | 90 | 100 | 100 | 75 | 90 | 80 | 92 | 90 |

The composites were tested statically on a universal testing machine using a four-point loading technique to measure flexure properties. The results are shown in Table III.

The specimens were instrumented between the inner two-load points and the strain recorded on a two-axes plot. The specimens were loaded to failure as indicated by complete physical separation or by large excursions and strain. Flexural tests were made for two samples of each composite and the results averaged. The moduli were determined from the initial slope of the stress-strain curves. In some cases, particularly for the higher Axial and four-point loading does not subject the specimen to shear deformation and therefore the fibers have the major influence on modulus. Conversely, cantilever and three-point loading placed the specimens under shear deformation and thus, would be influenced to a greater extent by the properties (e.g., modulus) of the matrix. Previous results have shown that four-point tests have produced modulus values as much as 50% higher than those from cantilevered tests. This difference, of course, is less for composites with high modulus resins. This accounts in part for the apparent inconsistencies in comparing flexure modulus of the various specimens and then comparing the corresponding torsion modulus. The percent differences in the torsional properties are generally much larger due to the above reason.

The shear properties were determined using a simple torsional loading fixture and manually loading cantilever specimens in torsion measuring the tip angular deflection and calculating the modulus from the formula $G=(Q/\theta'J)$ where Q is the applied torque, $\theta'$ the twist rate, and J the polar moment of inertia for the high damping specimens. The loading fixture was not sufficiently sensitive to accurately measure torsion since the weight pans themselves often cause the specimen to creep. For these cases estimates were made as noted in Table III.

Damping measurements were made using six-inch samples supported at one end. The samples were excited at their natural frequencies by striking them at the free end. The strain was measured at the root end and recorded on a Techtronics Dual Beam Storage Oscilliscope. The response curves are shown in FIGS. 2-7. The frequencies and damping levels were measured directly from these curves. A tip weight of 76 gms was added in some cases as indicated on the figures. The tip weight clamp was securely affixed to avoid looseness but not so tight as to prevent shear deformation at the free end. Some reduction in the free end shear probably occurred which would tend to add stiffness and reduce damping; however, no estimate was made. The specimen length of six inches was not maintained precisely which would account for some minor differences in frequency. Variations in this dimension were less than ±0.1 inch for all specimens except 9 and 10. For these cases the specimen length was approximately 7.5 inches. Damping levels were calculated by comparing response amplitudes at two adjacent peaks and substituting in the equation for damping ratio: $C/C_c=\delta/\sqrt{\delta^2+4\pi^2}$ where C=actual damping, $C_c$=critical damping, $\delta$=log $X_n/X_{n+1}$, $X_n$ and $X_{n+1}$ represent the dimensions of the two adjacent peaks.

Figure 8:
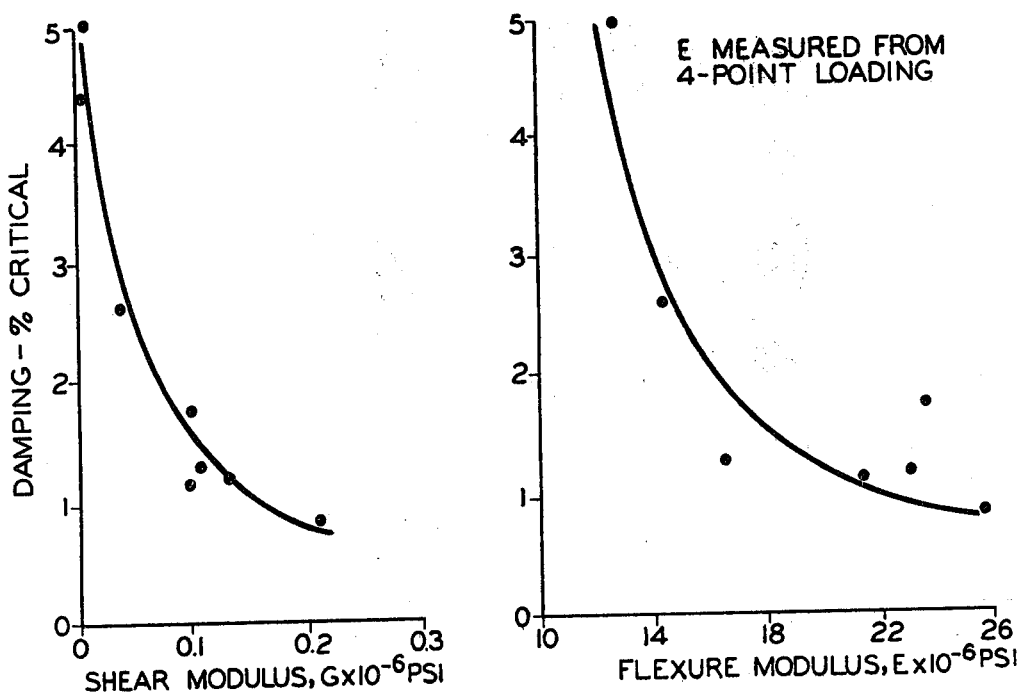
FIG. 8 demonstrates the relationship of damping to shear modulus and flexure modulus of composites of the present invention.

Damping levels were checked at various points to determine the effect of amplitude on damping and although the results showed some difference, no general trend was indicated. Also, the effect of tip weight did not indicate a consistent trend in its effect on damping. The results of the damping and modulus measurements are summarized in FIG. 8. The results on this figure should be viewed as qualitative since the moduli were difficult to define for the higher damping specimens.

Figure 9:
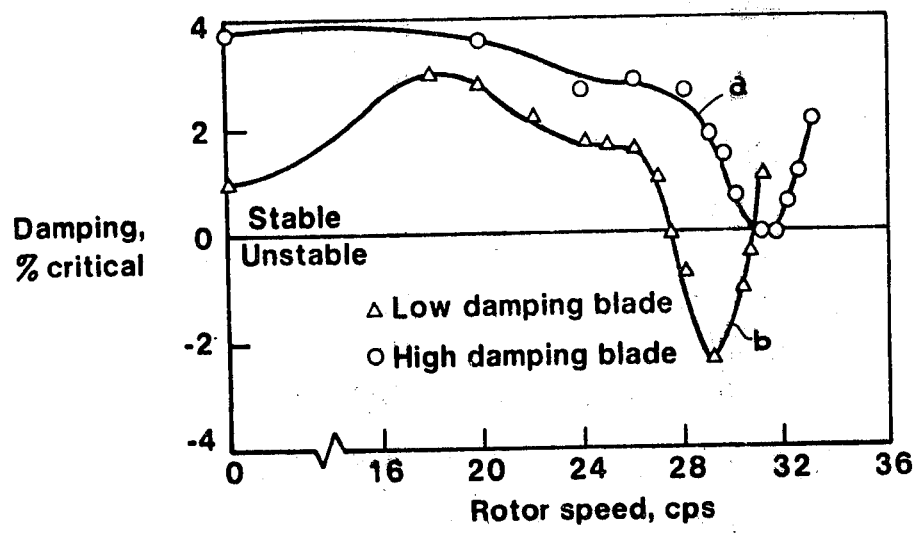
FIG. 9 demonstrates graphically a comparison of damping values of conventional composites and those of the present invention.

Attention should also be directed to FIGS. 1 and 9 for a comparison of conventional graphite/epoxy material (e.g., Canadian Patent 951,301) and the high damping material of the present invention and FIG. 9 when used in a matched stiffness composite bearingless rotor utilizing identical conditions and frequencies to compare stability characteristics under resonant conditions.

FIG. 9 compares the system stability of a helicopter wind tunnel model using a high damping rotor according to the present invention (curve A) with that of a conventional or low damping rotor (curve B). As can be seen from the tests, the blade system according to the present invention never really went unstable.

As evidenced by Table III composites of the present invention have the following properties: flexural strength greater than $5 \times 10^3$ psi and preferably greater than $15 \times 10^3$ psi; flexural modulus greater than $10 \times 10^6$ psi and preferably greater than $14 \times 10^6$ psi; damping up to about 3% critical and preferably up to about 6% critical; torsional shear modulus less than about $3 \times 10^5$ and preferably less than about $4 \times 10^4$; and stress at elastic limit greater than 60 psi and preferably greater than 90 psi.

Accordingly, it has been demonstrated that epoxy composites of the composition and percents specified have high internal damping. These damping levels can be controlled in this range chemically and through curing cycles as recited producing damping up to about 6% critical. The material at the high end of the range is generally unacceptable from the standpoint of stiffness and strength but the mid-range damping composites (e.g., sample No. 9 with a 2.64% damping) shows promise as a composite bearingless rotor flexbeam material for low edgewise stiffness designs. The damping levels do not appear to be affected by the addition of a concentrated mass, response frequency, or response amplitude, however, note the test in a rotating environment discussed above. In addition to the damping properties, the low shear modulus of these materials would allow significant reduction in flexbeam length.

Although this invention has been shown and described with respect to a preferred embodiment, it will be understood by those skilled in this art that various changes in form and detail thereof may be made without departing from the spirit and scope of the claimed invention.

Having thus described a typical embodiment of our invention, that which we claim as new and desire to secure by Letters Patent of the United States is:

1. A high damping, high strength, high modulus composite comprising:
   (a) a resin matrix comprising about 20% to about 43% by weight of a flexible epoxy comprising a linoleic dimer acid glycidal ester epoxy, about 12% to about 35% by weight of a stiff epoxy comprising an epichlorohydrin-bisphenol-A-diglycidal ether epoxy, about 35% to about 61% by weight of a flexible crosslinking agent comprising a long chain amine-fatty acid amide, and
   (b) about 20% to about 50% by weight of a high modulus graphite fiber based on the weight of fiber plus resin.

2. The composite of claim 1 wherein the stiff epoxy is present in an amount about 24% by weight, the flexible epoxy is present in an amount about 27% by weight, and the flexible curing agent is present in an amount about 49% by weight.

3. The composite of claim 2 wherein the fiber is present in an amount about 42% by weight.

4. The composite of claim 1 having a flexural strength greater than $5 \times 10^3$ psi, flexural modulus greater than $10 \times 10^6$ psi, damping up to about 6% critical, torsional shear modulus less than about $3 \times 10^5$, and stress at elastic limit greater than 60 psi.

5. The composite of claim 1 having a flexural strength about $15.6 \times 10^3$ psi, flexural modulus about $14.3 \times 10^6$ psi, damping about 2.64% critical, torsional shear modulus less than about $3.88 \times 10^4$, and stress at elastic limit about 95 psi.

* * * * *